United States Patent Office 3,284,513
Patented Nov. 8, 1966

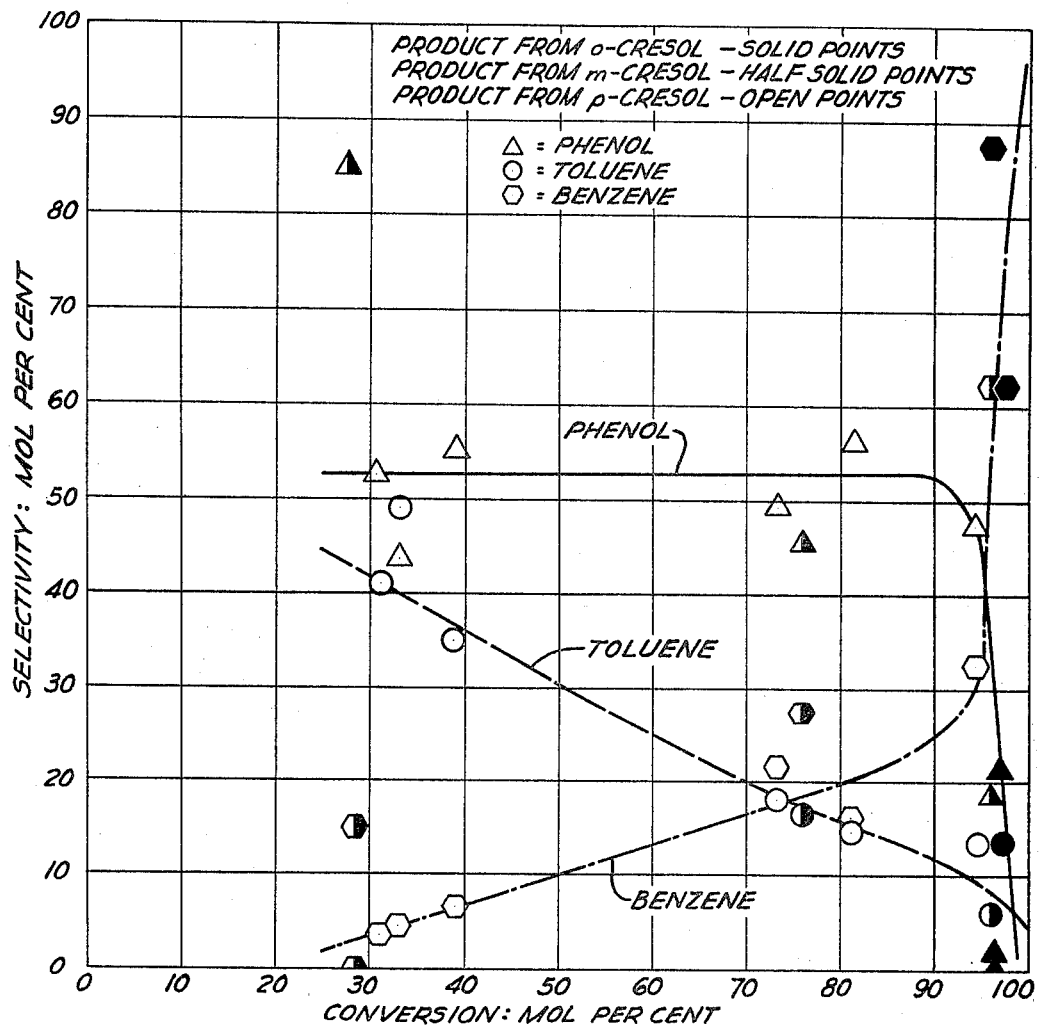

3,284,513
PROCESS FOR THE THERMAL HYDRO-DEALKYLATION OF CRESOLS
Jonas Dedinas, Pittsburgh, Alfred M. Henke, Springdale, and William C. Offutt, Pittsburgh, Pa., assignors to Gulf Research & Development Company, Pittsburgh, Pa., a corporation of Delaware
Filed Dec. 19, 1962, Ser. No. 245,848
4 Claims. (Cl. 260—621)

This invention relates to a process for the thermal hydrodealkylation of a monoalkylated phenol, such as cresols, to obtain phenol.

Alkyl aromatics, such as toluene, can be dealkylated to lighter aromatics, such as benzene, by subjecting such alkyl aromatic in the presence of hydrogen but in the absence of catalyst to an elevated temperature and an elevated pressure for a controlled length of time. As a result of such reaction conditions the alkyl group is cleaved from the alkyl aromatic and combines with the hydrogen present to form a saturated aliphatic hydrocarbon. The desired aromatic can be separated from the saturated aliphatic hydrocarbon and unreacted alkyl aromatic, if present, in any convenient manner.

When a monoalkylated phenol, such as a cresol, is similarly subjected to thermal hydrodealkylation, not only is the alkyl substituent removed and the same results noted above obtained, but there is also a tendency for the hydroxyl group to be cleaved from the aromatic ring and be replaced with a hydrogen. The hydroxyl group so removed combines with another hydrogen to form water. Accordingly a monoalkylated phenol, under such circumstances, will be converted to benzene instead of phenol and a large amount of methane and water will be formed.

We have found that a monoalkylated phenol, such as a cresol, can be dealkylated and maximum selectivity to phenol can be obtained by converting no more than about 88 to about 92 mol percent, preferably no more than about 90 mol percent, of the monoalkylated phenol subjected to thermal hydrodealkylation. Any amount of monoalkylated phenol below the defined amount can be converted and maximum selectivity to phenol will result when the monoalkylated phenol is heated at the elevated temperatures defined herein in the presence of hydrogen, but for economic purposes we prefer to convert on a minimum basis about 25 to about 35 mol percent of the monoalkylated phenol charge.

The reaction product obtained at the end of the conversion period will contain predominantly monoalkylated benzene such as toluene, phenol, benzene, methane, water and unreacted monoalkylated phenol and hydrogen. An embodiment of our invention envisions separating phenol, benzene, methane, water and unreacted monoalkylated phenol and hydrogen from the reaction product. Monoalkylated benzene, such as toluene, remaining can then be subjected to thermal hydrodealkylation as set forth hereinabove to obtain additional benzene.

In order to carry out the reaction the charge, for example, cresol (ortho, meta or para or any combination thereof) and hydrogen, together or separately, are first preheated to reaction temperature in any suitable manner, for example by passing the same through a tubular member in indirect contact with heat-producing elements such as burners. The amount of hydrogen which must be present in the charge must be that sufficient to replace the alkyl chain and hydroxyl group cleaved from the aromatic ring at the elevated reaction temperature and also to combine with the alkyl chain and hydroxyl group so removed to form a saturated aliphatic hydrocarbon and water, respectively. In general while the molar ratio of hydrogen to monoalkylated phenol can vary over a wide range a molar ratio of one to about 10, preferably about four to about eight, is employed.

Any type of reactor, but preferably a tubular reactor, heated, for example, in the same manner as the preheater described above, can be employed. The walls of the reactor should be free of material which will catalyze the thermal dealkylation procedure defined herein, and the interior of the reactor should similarly be free of catalytic material. If desired the reactor can be filled with non-catalytic material, such as quartz chips, in order to effect better mixing and to reduce temperature gradients therein.

The temperature required to effect the desired hydrodealkylation can be from about 900° to about 1600° F., preferably from about 1000° to about 1350° F. While pressure is not critical and can be in excess of about 100 pounds per square inch gauge, we prefer to employ a pressure in the range of about 200 to about 1000 pounds per square inch gauge. A space velocity of at least about 0.2, preferably about 0.5 to about 3.5 (total volume of monoalkylated phenol per free reactor volume per hour) can be employed.

The reaction is continued and then terminated, as noted hereinabove, when no more than about 88 to 92 mol percent of the monoalkylated phenol has been converted. To terminate the reaction, the reaction mixture is quenched to a temperature where the reaction essentially ceases, which can be from about 80° to about 800° F., in any suitable manner, for example, by direct contact with cooled, previously-formed product.

Maximum selectivity of monoalkylated phenol to phenol has been obtained in the product so recovered. The product obtained consists essentially of phenol, monoalkylated benzene, such as toluene, benzene, unreacted monoalkylated phenol and hydrogen, methane, water and some heavy material believed to be conjugated phenol, toluene and benzene derivatives. To recover the phenol this product can be treated in any suitable manner to remove water therefrom, for example, by passing the same through 4A Linde molecular sieves or other adsorbent material having a greater specificity for water than the hydrocarbons or phenol. The remaining product for purposes of recovery can be separated into its individual components or selected combinations thereof by any suitable means, by fractional distillation at subatmospheric, atmospheric or superatmospheric pressure, for example, a temperature of about 170° to about 450° F. and atmospheric pressure.

An extremely attractive feature of our present process is that while the process can be operated to obtain maximum selectivity to phenol, monoalkylated benzene produced can be further treated to produce additional benzene. Thus from the reaction product a fraction thereof containing solely a monoalkylated benzene, such as toluene, or in combination with benzene, together with about one to about 10 mols thereof of hydrogen, can be subjected in the same reactor, or one similar to the reactor employed to convert monoalkylated phenol to phenol, to a temperature of about 1050° to about 1350° F. and a pressure of about 250 to about 1200 pounds per square inch gauge while employing a space velocity of about 0.5 to about 3.0. As a result thereof the monoalkylated benzene, such as toluene, will be converted to benzene and methane will be obtained in the manner previously described. The product can be quenched to a temperature where the reaction essentially ceases, which can be in the range of about 80° to about 800° F., in any suitable manner, and the benzene recovered therefrom by fractional distillation at subatmospheric, atmospheric or superatmospheric pressures, for example, at 240° F. and atmospheric pressure.

The process of this invention can be further illustrated by reference to the following. Thermal hydrodealkylation runs were made, using as charge therefor ortho, meta- and p-cresols, in a reactor having a length of four inches and an inner diameter of one inch filled with a noncatalytic material, quartz chips, to effect better mixing and to reduce temperature gradients. Each of the charge stocks was mixed with hydrogen before preheating. The average reactor temperature was determined from several temperature measurements made inside the reactor with a movable chromel-alumel thermocouple. Pressures and temperatures were maintained at set values by means of automatic control instruments. The unit was run two hours offstream to allow for stabilization of process conditions. Subsequently, a two to four hour on-stream period was made during which product was collected and process conditions were maintained constant. The results obtained are tabulated below in Table I.

The hydrogen employed in the thermal hydrodealkylation process defined herein need not be pure but may be present in a gaseous stream also containing materials which will not adversely affect the desired reaction. Coke oven gas, for example, can advantageously be employed for purposes of supplying hydrogen for the reaction. The composition of coke oven gas, in mol percent, is as follows: 53.1 percent hydrogen, 26.2 percent methane, 5.3 percent ethane and ethylene, 0.4 percent heavier hydrocarbons, 5.8 percent carbon monoxide, 2.8 percent carbon dioxide, 0.5 percent hydrogen sulphide and 5.9 percent nitrogen. Since the hydrogen in such stream is consumed in the process and a saturated aliphatic hydrocarbon, such as methane, is formed, the resultant gas will contain more saturated aliphatic hydrocarbon and less hydrogen than the charge gas. Since on a volume basis the saturated aliphatic hydrocarbon has a higher caloric value than hydrogen, the resultant gas will have an enhanced caloric value. For such reason in some cases an impure hydrogen stream is desirable as a source of hydrogen.

Obviously many modifications and variations of the invention, as hereinabove set forth, can be made without departing from the spirit and scope thereof, and only such limitations should be imposed as are indicated in the appended claims.

We claim:

1. A process for converting a cresol which comprises

| Run No. | 1 | 2 | 3 | 4 | 5 | 6 | 7 | 8 | 9 | 10 | 11 |
|---|---|---|---|---|---|---|---|---|---|---|---|
| Charge | o-Cresol | | m-Cresol | | | p-Cresol | | | | | |
| Duration of On-Stream Period, Hrs | 2 | 2 | 2 | 2 | 2 | 2 | 2 | 2 | 2 | 2 | 2 |
| Conditions: | | | | | | | | | | | |
| Temperature, ° F | 1,269 | 1,355 | 1,150 | 1,250 | 1,350 | 1,153 | 1,149 | 1,266 | 1,253 | 1,250 | 1,106 |
| Pressure, p.s.i.g. | 775 | 775 | 775 | 775 | 775 | 750 | 750 | 750 | 750 | 750 | 750 |
| Space Velocity, Vol./Vol./Hr | 0.97 | 0.93 | 0.80 | 1.1 | 2.0 | 1.6 | 2.1 | 2.0 | 2.6 | 0.9 | 1.9 |
| Hydrogen/Cresol, Mol./Mol | 3.3 | 3.2 | 4.0 | 4.8 | 3.6 | 4.8 | 4.8 | 4.8 | 4.8 | 4.0 | 4.8 |
| Conversion, Mol Percent | 97.7 | 96.7 | 28.7 | 76.1 | 96.1 | 39.2 | 33.3 | 73.4 | 81.4 | 94.6 | 31.6 |
| Selectivity, Mol Percent: | | | | | | | | | | | |
| Phenol | 21.1 | 1.6 | 85.0 | 45.6 | 18.8 | 55.1 | 43.6 | 49.9 | 56.2 | 48.0 | 52.2 |
| Benzene | 63.0 | 87.7 | 15.0 | 28.1 | 62.7 | 7.0 | 4.7 | 21.4 | 16.2 | 32.5 | 3.7 |
| Toluene | 13.4 | 0.7 | 0.0 | 17.1 | 5.9 | 35.5 | 49.3 | 18.5 | 15.1 | 14.0 | 41.4 |
| Total Selectivity, Mol Percent | 97.5 | 90.0 | 100.0 | 90.8 | 87.4 | 97.6 | 97.6 | 89.8 | 87.5 | 94.5 | 97.3 |

The data from Table I are graphically represented in the drawing. With the exception of selectivity of meta cresol to phenol of 85 mol percent, which would be extremely desirable, at a conversion level of 28.7 mol percent, all of the data obtained fit to a single correlation reasonably well. The drawing shows that selectivity to phenol from cresol, particularly para cresol, was about 53 mol percent throughout the conversion range studied and that this selectivity was maintained until about 88 to about 92 mol percent of the cresol charge was converted. This constant selectivity provides evidence that phenol is produced by a primary decomposition of cresols and that it does not undergo secondary decomposition until conversion of any cresol is above about 88 to about 92 mol percent. Initially selectivity to toluene was high but low to benzene. With increasing conversion, however, selectivity to toluene greatly decreased, evidently because of secondary conversion to benzene. The evidence of a secondary decomposition of toluene is based on the fact that selectivity to benzene increased in proportion to toluene disappearance.

This result is an extremely attractive feature of our invention wherein cresol is converted to phenol and the remainder of the converted product is desired as benzene rather than toluene. Selectivity of cresol to phenol remains at its maximum throughout the reaction period. At the same time conversion of toluene to benzene is increased. At the end of the reaction period the toluene remaining can be recovered and dealkylated in the manner stated. In this way the cresol charge can be converted almost solely to phenol and benzene and to the maximum amounts of each, reacting a cresol with at least about one mol per mol thereof of hydrogen at a temperature of about 900° to about 1600° F., at a space velocity of about 0.2 to about 3.5, terminating said reaction when about 88 to about 92 mol percent of said cresol has been converted and thereafter recovering phenol from the reaction product.

2. A process for converting ortho cresol which comprises reacting ortho cresol with at least about one mol per mol thereof of hydrogen at a temperature of about 900° to about 1600° F. at a space velocity of about 0.2 to about 3.5, terminating said reaction when about 88 to about 92 mol percent of said cresol has been converted and thereafter recovering phenol from the reaction product.

3. A process for converting meta cresol which comprises reacting meta cresol with at least about one mol per mol thereof of hydrogen at a temperature of about 900° to about 1600° F. at a space velocity of about 0.2 to about 3.5, terminating said reaction when about 88 to about 92 mol percent of said cresol has been converted and thereafter recovering phenol from the reaction product.

4. A process for converting para cresol which comprises reacting para cresol with at least about one mol per mol thereof of hydrogen at a temperature of about 900° to about 1600° F. at a space velocity of about 0.2 to about 3.5, terminating said reaction when about 88 to about 92 mol percent of said cresol has been converted and thereafter recovering phenol from the reaction product.

(References on following page)

References Cited by the Examiner

UNITED STATES PATENTS

| | | | |
|---|---|---|---|
| 1,947,648 | 2/1934 | Hofmann et al. | 260—621 X |
| 2,003,941 | 6/1935 | Kahl | 260—621 X |
| 3,182,094 | 5/1965 | Glazier et al. | 260—672 |

FOREIGN PATENTS 657,207  3/1938  Germany.

OTHER REFERENCES

Ellis: Hydrogenation of Organic Substances (3rd edition 1930), page 510.

Egloff: The Reactions of Pure Hydrocarbons (1937), pages 530, 531, 540, 541 (4 pages).

Gonikberg et al.: Chem. Abstracts, 54:22439–440 (1960).

LEON ZITVER, *Primary Examiner.*

HAROLD G. MOORE, *Examiner.*

D. M. HELFER, *Assistant Examiner.*